United States Patent Office 3,652,708
Patented Mar. 28, 1972

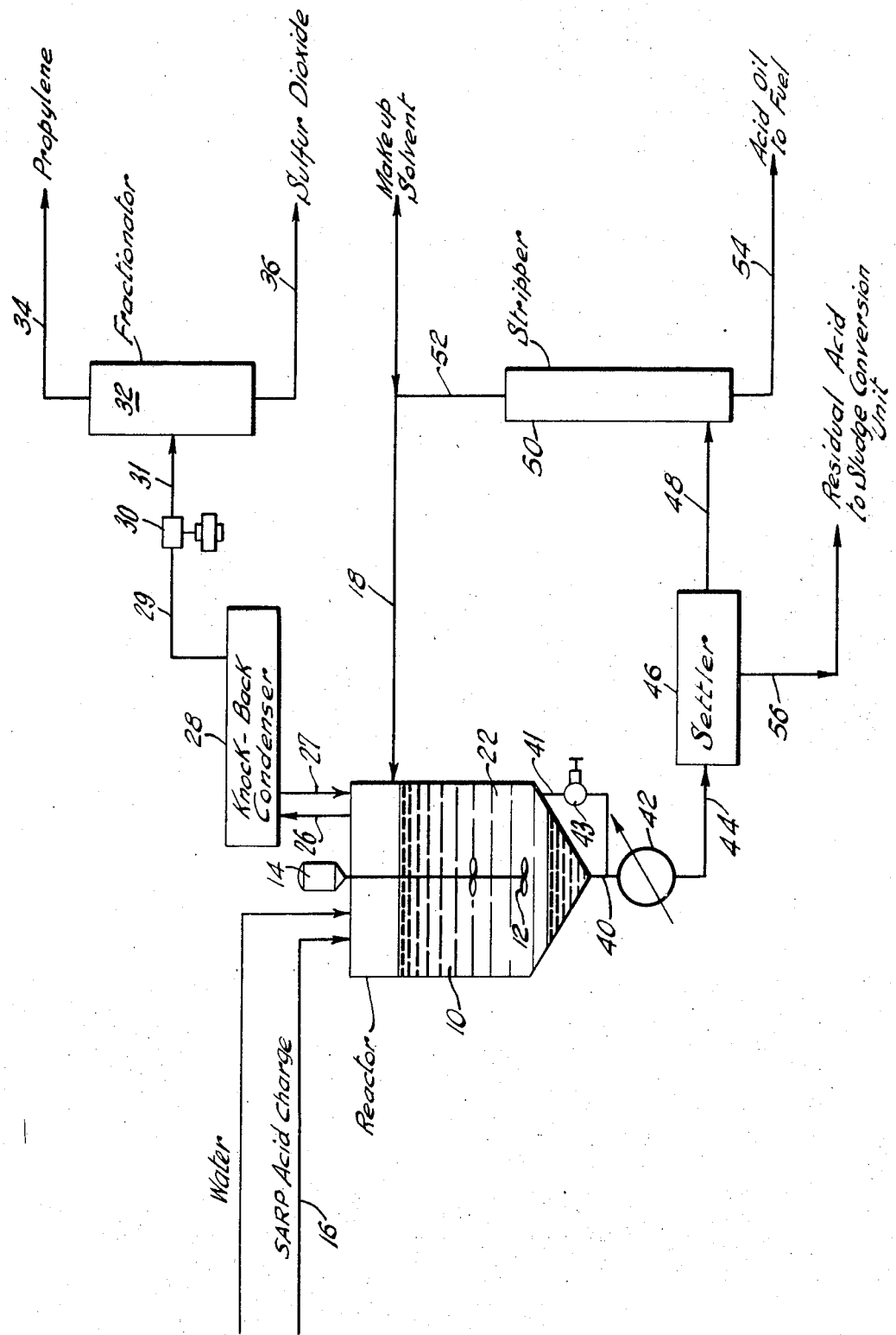

3,652,708
REDUCTION OF HYDROCARBON CONTENT OF SPENT SULFURIC ACID
Ralph M. Lewis, Weston, Conn., Charles T. Lewis, Jr., Nederland, Tex., George B. Tupper, Baton Rouge, La., and Gary D. Popken, Nederland, Tex., assignors to Texaco Inc., New York, N.Y.
Filed June 24, 1970, Ser. No. 49,471
Int. Cl. C07c 3/54
U.S. Cl. 260—683.62
9 Claims

ABSTRACT OF THE DISCLOSURE

Hydrocarbon content of spent sulfuric acid is reduced by heating with agitation at a temperature of 260–275° F. in admixture with a hydrocarbon which is non-boiling at this temperature. Method is applicable to a residue acid obtained by absorbing propylene in used sulfuric acid alkylation catalyst to form diisopropyl sulfate and extracting dipropyl sulfate therefrom with isobutane. Sulfur dioxide and propylene are evolved as off gases.

BACKGROUND OF THE INVENTION

Field of the invention

This invention relates to the recovery of sulfuric acid containing organic contaminants and more particularly to the recovery of acid which has been used as a catalyst in the alkylation of isoparaffins with olefins. Even more particularly it relates to the recovery of used alkylation acid whereby the used acid is reacted with olefins to form dialkyl sulfates which are then extracted with a hydrocarbon solvent, leaving a raffinate acid containing organic contaminants.

Description of the prior art

Strong sulfuric acid used as a catalyst in the alkylation of isobutane with aliphatic olefins gradually becomes contaminated with water and polymeric hydrocarbons resulting in a decline in acid concentration. When the titratable acidity of the acid drops from about 98.0–99.5% to about 85–90% it becomes necessary to withdraw a portion of the acid from the alkylation system for recovery, which involves reducing the water and hydrocarbon content of the used acid in some manner. In one method olefins are reacted with used alkylation acid of about 85–90% titratable acidity to form primarily dialkyl sulfates which are then extracted with a hydrocarbon solvent and charged to the alkylation zone. The acid remaining after the extraction step is greatly reduced in sulfuric acid content and correspondingly increased in water and hydrocarbon content. Such a recovery process will be hereinafter referred to as SARP (sulfuric acid recovery process) and spent acid from this process will be referred to as SARP acid. Due to its high hydrocarbon content, it is desirable to treat SARP acid in some manner to reduce the hydrocarbon content to facilitate recovery of the sulfur values therefrom by burning in a sludge conversion process.

In the case of the effluent acid from sulfuric acid alkylation and from SARP, the acid can be recovered or its water and hydrocarbon content reduced and its sulfuric acid content increased by burning to form sulfur dioxide, catalytically oxidizing the sulfur dioxide with oxygen to sulfur trioxide, and dissolving the sulfur trioxide in sulfuric acid to produce acid of the desired concentration. This type of acid recovery plant is called a sludge conversion unit (SCU). For complete conversion of the $H_2SO_4$ to $SO_2$ by burning with air it is essential that the combustion chamber be maintained at approximately 1800–2000° F. If the acid is low in combustibles, fuel gas must be added to supply the additional heat required to maintain the desired temperature of 1800–2000° F. If the acid is high in combustibles, no fuel gas needs to be added. Instead, water must be added to remove excess heat released above that required to maintain 1800–2000° F. Thus, in the case of spent alkylation acid which is low in hydrocarbon, it is necessary to add fuel gas. In the case of SARP acid which is high in hydrocarbon, it is necessary to add water to keep the combustion temperature down to 1800–2000° F. Furthermore, in order to obtain complete combustion of both hydrocarbon and acid, so much air has to be added that the capacity of a sludge conversion acid recovery plant or SCU is severely reduced.

SUMMARY OF THE INVENTION

The present invention relates to a method for reducing the hydrocarbon content of SARP acid, or an acid of similar composition, by heating the acid in admixture with a hydrocarbon solvent.

We have discovered that the hydrocarbon content of SARP acid can be reduced by about 50% or more by heating the acid in the presence of a hydrocarbon solvent with agitation at a temperature within the range of about 150–300° F. and preferably within a range of about 260–275° F. Propylene and sulfur dioxide are continuously evolved as gases as the reaction proceeds and are removed from the reaction vessel. It has been found that the relative quantity of $SO_2$ evolved is less than would be predicted from the quantity of propylene evolved, i.e., the $C_3H_6/SO_2$ molar ratio is higher than theoretical. This is beneficial in that an acid of higher concentration is obtained with the evolution of less $SO_2$. Polymeric oil released from the acid becomes dissolved in the hydrocarbon solvent. The acid which can be separated from the hydrocarbon solvent after the reaction has been completed has a lower hydrocarbon content and is of improved quality as a charge stock to a sludge conversion unit for the production of white, concentrated sulfuric acid. If desired, a hydrocarbon solvent can be used with a bubble point or boiling point within the specified range of temperature and the reaction carried out at reflux temperature. However, it is preferred to operate below the boiling point of the solvent, or in other words, with a solvent having a boiling point which is higher than the desired operation temperature. It further has been found that substantial amounts of water advantageously can be added to the SARP acid before or during the operation of heating the acid in the presence of hydrocarbon solvent with the result that less sulfur dioxide is evolved and a greater quantity of acid oil is rejected from solution in the acid to solution in the hydrocarbon solvent. The amount of water which they may be added can be equal to but should not exceed that required to limit temperatures in the sludge conversion unit to a maximum of 2000° F. Preferably the amount of water added to the acid in the decomposition step should be such as to result in a balanced charge to the sludge conversion unit, i.e. a charge composition such that no water or fuel is required to be added to maintain a 2000° F. burning temperature in the sludge conversion unit. The amount of water added to the SARP acid can be as high as about 20% by weight, or even higher, depending on the exact composition of the acid.

An object of our invention is to reduce the hydrocarbon content of SARP acid to improve it as a charge stock for a sludge conversion unit.

Another object is to reduce the hydrocarbon content of SARP acid with the minimum formation of tarry sludge which is insoluble in the acid and solvent.

Another object is to retard uncontrolled polymerization reactions which result in tarry sludge.

Another object is to carry out the reaction under controlled temperature conditions so as to minimize adverse polymerization and to have a smooth, controlled reaction.

Another object is to recover valuable propylene from the SARP acid for use in SARP or in alkylation.

BRIEF DESCRIPTION OF THE DRAWING

The drawing shows a simplified flow sheet of a continuous process embodying the principles of the invention.

DESCRIPTION OF THE PREFERRED EMBODIMENT

The following description of the process exemplified in the drawing is based upon charging acid containing propyl sulfates resulting from the absorption of propylene in used alkylation acid in the associated SARP unit. Obviously, other alkylatable olefins also may be employed and specific operating conditions adjusted accordingly. The scope of the invention, therefore, is not intended to be limited to operations involving propylene or propyl sulfates. The use of other alkylatable olefins, such as butylenes and amylenes and their corresponding sulfates also is contemplated by and is within the scope of the invention.

Referring to the drawing, SARP or equivalent acid produced as described hereinafter is charged through line 16 and hydrocarbon and hydrocarbon solvent, such as n-decane, through line 18 to reactor 10. Water for achieving a balanced charge for subsequent burning of the residual acid in a sludge conversion unit may be introduced through line 19 as desired. Reactor 10 preferably is operated at substantially atmospheric pressure although vacuum or elevated pressure may be used. In reactor 10 the acid and hydrocarbon solvent are mixed by agitator 12 driven by motor 14 to maintain a uniform temperature throughout the reactor. When the alkyl sulfates in the acid are comprised of propyl sulfates a temperature in the vicinity of 275° F. is employed to effect decomposition of the alkyl sulfates. Agitation of the reactor contents also facilitates the removal of gaseous products. The hydrocarbon solvent introduced through line 18 serves as a diluent and also serves to inhibit polymerization reactions. n-Decane is suitable as the hydrocarbon solvent when operating at a temperature of about 275° F. because its boiling point is above the reactor temperature. However, other high boiling inert solvents can be used.

Propylene and sulfur dioxide are evolved in the gaseous state from decomposition of propyl sulfates and pass as overhead from reactor 10 through gas line 26 to knockback condenser 28 where the temperature of the propylene-sulfur dioxide gaseous mixture is reduced to about 40° F. Solvent entrained with the gases is condensed and returned to reactor 10 through line 27. Gases passing on through condenser 28 are charged through line 29 to compressor 30 where they are compressed to about 275 p.s.i. and charged through line 31 to a packed tower or other type of fractionator 32 operated under pressure. Propylene is taken overhead from fractionator 32 through line 34. The propylene can be returned to the SARP absorber for reaction with used alkylation acid, sent to alkylation for reaction with isobutane or used in any other manner desired. Liquid sulfur dioxide is taken off through line 36 from the bottom of fractionator 32. The sulfur dioxide can be neutralized with caustic or lime, but preferably is combined with the residual acid in line 56 and sent to a sludge conversion unit or it may be passed as a separate stream to a sludge conversion unit.

The concentrated acid phase which also contains a quantity of dissolved solvent settles to the bottom of reactor 10 and is drawn off through line 40. The solvent phase consists of about one-fourth dissolved oil and any tarry material formed in the decomposer reactor. A portion of the solvent phase is continuously withdrawn from decomposer reactor 10 through line 41 and flow control valve 43 and is then combined with the acid phase in line 40. The combined stream is then passed to cooler 42 wherein the temperature is reduced to about 150° F. The cooled mixture is then passed through line 44 into settler 46. An acid phase of reduced hydrocarbon content and any insoluble tarry material formed is withdrawn through line 56 to a sludge conversion unit for conversion to concentrated acid. Solvent phase containing polymeric oil dissolved from the acid charged to reactor 10 is withdrawn from the upper portion of settler 46 through line 38 and passed to stripper 50. Polymeric or acid oil is removed from the bottom of stripper 50 through line 54. This oil can be used as fuel. Hydrocarbon solvent is taken overhead through line 52 and returned to reactor 10 along with any make-up solvent required.

SULFURIC ACID RECOVERY PROCESS

The SARP acid arises from the Sulfuric Acid Recovery Process, as described in recently issued Pat. 3,227,774; 3,227,775; 3,234,301; 3,422,164; 3,428,705; and 3,448,168. Briefly, used alkylation acid of about 90% titratable acidity withdrawn from a sulfuric acid alkylation process is reacted with an excess of olefin such as propylene, butylenes and amylenes, preferably with the normal olefins, to form dialkyl sulfates. The dialkyl sulfates are extracted with isobutane and the isobutane-dialkyl sulfate charged to alkylation along with isobutane, additional olefin and sulfuric acid.

It is advantageous to treat the isobutane-dialkyl sulfate extract solution with used alkylation acid to remove polymeric oil prior to charging it to alkylation. The acid phase remaining after extraction of dialkyl sulfates, representing only about 10 to 50% of the acid charged to SARP on an equivalent basis, is of relatively high hydrocarbon content. As in the case of spent alkylation acid, it must be disposed of in some manner.

SULFURIC ACID ALKYLATION

The charge acid for SARP is the spent acid from the sulfuric acid alkylation process for the alkylation of isoparaffins with olefins. The process is widely used commercially. Briefly, the reaction is carried out at about 30 to 50° F. with efficient mixing. Strong sulfuric acid of 98.0 to 99.5% by weight $H_2SO_4$, olefins and isobutane are continuously charged to a reactor with the isobutane in great excess of the olefin. The reaction mixture is separated into an acid phase and a hydrocarbon phase. Most of the acid phase is recycled to the reactor and a small portion amounting to about 0.3 to 1.0 pound per gallon of alkylate is withdrawn. This small portion is referred to as used alkylation acid. It has a titratable acidity in the range of about 85 to 92% $H_2SO_4$, usually about 90%. Propylene, butylenes and amylenes are olefins most commonly used. The composition of the spent acid does not vary appreciably with the olefin used, although the amount of spent acid will vary. In general the hydrocarbon content of the spent acid increases with decreasing titratable acidity. This spent acid can be used for fertilizer manufacture, for conventional recovery by burning, or as the charge acid to the sulfuric acid recovery process described above, and designated for convenience purposes herein as SARP.

DISCUSSION OF THE VARIABLES

Although SARP acid is the preferred charge for our invention, any used sulfuric acid of similar composition is satisfactory, provided the acid contans alkyl sulfates of propylene, butylenes or amylenes in appreciable concentration, for example, 20 to 60% by weight, as well as acid soluble polymeric oil. The acid should not contain more water than the amount required to achieve a balanced condition in the sludge conversion unit, a balanced condition being one which does not require the addition of either water or fuel to maintain a temperature of about 2000° F. in the sludge conversion unit. With SARP acid the total water content of the acid may be as high as about 25–30%. Any deficiency in the water content can be corrected by the addition of water to the decomposer reactor vessel. The acid will usually have a polymeric oil content of about 10–30%.

A typical analysis of SARP acid is shown below in weight percent:

| | |
|---|---|
| Free sulfuric acid | 13.0 |
| Acid-oil complex: | |
|     Sulfuric acid | 15.0 |
|     Polymeric oil | 15.0 |
| Isopropyl acid sulfate | 44.8 |
| Diisopropyl sulfate | 7.6 |
| Water | 4.6 |
| | 100.0 |

It is not believed any free polymeric oil is present in the acid, but rather that it is tied up as a chemical complex with the acid. Although the exact composition of the complex is not known, we shall throughout the application assume that the complex is made up of an equal weight of acid and polymeric oil.

Any stable solvent of the proper boiling point or boiling range can be used, such as pure naphthenes and paraffins, or mixtures thereof. The solvent should not react with sulfuric acid of the type being processed. It should have a high solubility for the polymeric oil, and preferably the solvent and oil should be miscible in all proportions.

We prefer a paraffinic solvent, such as n-decane, or an essentially paraffinic mixture. If a pure compound, the solvent should have a boiling point above the desired reaction temperature of, for example, 265–275° F. and below the boiling range of most of the polymeric oil which is to be removed from the SARP acid. Thus, n-decane, which has a boiling point of approximately 343° F. is a satisfactory solvent. An essentially paraffinic solvent mixture containing some naphthenes and with a boiling range of about 300–350° F. is also satisfactory. The amount of polymeric oil extracted from SARP acid by the n-decane solvent increases linearly with solvent-to-acid volumetric ratio. When extracting an acid containing 15% by weight of polymeric oil tied up as acid-oil complex, about 5% of oil by weight basis the acid was extracted, or about ⅓ of the oil present. Enough solvent should be present to give a two phase system. Based on the respective charge rates of solvent and acid streams to the reactor a solvent-to-acid ratio of about 0.1 to 5.0, or from 10% to 500% by volume of the acid, is satisfactory.

Efficient reactor mixing of a type which gives a good dispersion of the acid in the solvent is preferred with the level of the acid in the bottom of the reactor maintained as low as possible to minimize the acid residence time and thereby minimize the formation of insoluble sludge. The decomposition reaction is quite fast, with the immediate evolution of propylene and sulfur dioxide. Hence, if the mixing is of such a nature that an excessive amount of acid builds up in the bottom of the reactor, a side stream of solvent containing dissolved polymeric oil may be withdrawn as well as acid from the bottom of the reactor.

As indicated hereinbefore, a temperature for the decomposition reaction of about 150–300° F. is satisfactory and a temperature of about 265–275° F. is preferred. The reaction rate is too slow below about 230° F. Above about 280° F. the formation of tarry, insoluble sludge becomes excessive. Less isopropyl acid sulfate is decomposed at 230° F. than at 260–275° F. The formation of insoluble sludge complicates the processing. A pressure of 0–100 p.s.i.g. is satisfactory. The pressure should be low enough to permit the propylene and sulfur dioxide to be taken overhead as a gas.

If the reaction is carried out under conditions which result in the production of an appreciable quantity of tarry material insoluble in the acid and hydrocarbon phases, it is advantageous to segregate this material so that it can be sent to fuel rather than to an acid recovery plant, since it is relatively low in sulfur and high in hydrocarbon. The tarry product is intermediate in gravity to the solvent used and the residual acid produced. With poor mixing, it may be withdrawn from the bottom of the reactor along with acid, or in a reactor with good mixing it may be withdrawn as an intermediate phase from the settler through line 41.

As indicated above, the decomposition reaction which results in the production of propylene and sulfur dioxide at about 265–275° F. is quite fast. However, the reactions which result in polymeric oil dissociated from the acid seem to be somewhat slower. In continuous operation, a time of about 1–60 minutes, or even longer, is satisfactory. However, we prefer a reaction time of about 1 to 10 minutes. In general, shorter times can be used with higher temperatures. However, if temperatures above about 280° F. are used, excessive amounts of tarry material are formed.

Cooler 42 is provided for cooling the reaction mixture from reactor 10. If the reaction mixture is cooled to about 150° F., a better separation of the hydrocarbon and acid phases is obtained in settler 46.

EXAMPLE

The general procedure described in connection with the drawing was used to process 1000 cc. of SARP acid of 1.286 specific gravity at 265–275° F. at atmospheric pressure over a period of 92 minutes with a n-decane to acid ratio of 0.5. The mixing was of such a nature that a layer of acid separated in the bottom of the reactor with the result that the effective time of contact of the acid with the solvent was quite short. An acid product of reduced hydrocarbon content and specific gravity of 1.450 in the amount of 616.4 cc. was obtained.

The pertinent data, adjusted for a 100% weight balance, are shown below:

TABLE I

| | Sarp acid charge | Product |
|---|---|---|
| Liquid acid phase product composition (percent by weight basis acid charge): | | |
|   Free sulfuric acid | 13.0 | 27.9 |
|   Acid oil complex: | | |
|     Sulfuric acid | 15.0 | 10.2 |
|     Polymeric oil | 15.0 | 10.2 |
|   Isopropyl acid sulfate | 44.8 | 13.7 |
|   Diisopropyl sulfate | 7.6 | 0.0 |
|   Water | 4.6 | 10.1 |
| Gaseous product composition (percent by weight basis acid charge): | | |
|   Propylene gas | 0.0 | 12.8 |
|   Sulfur dioxide gas | 0.0 | 10.3 |
| Polymeric oil removed in solvent | 0.0 | 4.8 |
| Total | 100.0 | 100.0 |
| Yield of acid phase as vol. percent basis acid charge | 100.0 | 63.9 |
| Yield of acid phase as wt. percent basis acid charge | 100.0 | 72.1 |
| Acid phase: | | |
|   Specific gravity | 1.286 | 1.450 |
|   Weight percent reduction | | 27.9 |
|   Volume percent reduction | | 36.1 |
|   Hydrocarbon content | 32.0 | 19.8 |
|   Reduction in hydrocarbon content including propylene | | 55.4 |
|   Decomposition of diisopropyl sulfate | | 100.0 |
|   Decomposition of isopropyl acid sulfate | | 69.4 |
|   Polymeric oil removed, percent by wt. of oil in acid charge | | 32.0 |
|   Propylene removed, percent by wt. of propylene in acid charge | | 75.3 |

It will be seen from Table I that the SARP acid remaining after the decomposition reaction, and which must be further processed as in a SCU, has been reduced 27.9% by weight or 36.4% by volume. In addition, the hydrocarbon content has been reduced by 55.4% weight, making it a much better acid for charging to a SCU. Although not shown in the data, and in spite of the loss of some sulfur dioxide, the equivalent $H_2SO_4$ content of the acid has been increased from 63.5% to 66.1%, and the sulfur content from 20.9% to 21.5% by weight. A major portion of the propylene in SARP acid, 75.3%, is shown as being recovered for reuse in SARP or in alkylation.

Obviously, many modifications and variations of the invention as hereinabove set forth, may be made without departing from the spirit and scope thereof, and therefore, only such limitations should be imposed as are indicated in the appended claims.

We claim:
1. A process for treating sulfuric acid recovered from an alkylation reaction, which comprises:
   (a) reacting said sulfuric acid with an exces of an aliphatic olefin to form dialkyl sulfate;
   (b) extracting said dialkyl sulfate with a first hydrocarbon solvent leaving a raffinate acid containing polymeric oil and alkyl sulfates;
   (c) heating said raffinate acid in admixture with a second hydrocarbon solvent at a temperature in the range of 150–300° F. to separate from the liquid phase a gaseous phase comprising an aliphatic olefin and sulfur dioxide;
   (d) recovering aliphatic olefin and sulfur dioxide from said gaseous phase, and
   (e) separating the liquid phase remaining after step (c) into a hydrocarbon phase containing polymeric oil and tarry material and an acid phase comprising sulfuric acid of reduced hydrocarbon content.
2. The process of claim 1 in which said aliphatic olefin is selected from the group consisting of propylene, butylene and amylenes.
3. The process of claim 1 in which said second hydrocarbon solvent is a saturated aliphatic hydrocarbon.
4. The process of claim 3 in which said hydrocarbon solvent is n-decane.
5. The process of claim 1 in which the amount of said second hydrocarbon solvent heated with said sulfuric acid is in the range of 10 to 500 percent by volume of said sulfuric acid.
6. The process of claim 1 in which the amount of alkyl sulfates in said sulfuric acid containing polymeric oil and alkyl sulfates are in the range of 20 to 60% by weight of said acid.
7. The process of claim 1 in which said heating of said sulfuric acid with said solvent is conducted at a temperature of about 265–275° F.
8. The process of claim 1 in which said acid phase comprising sulfuric acid of reduced hydrocarbon content is passed to a sludge conversion process.
9. The process of claim 1 in which said heating of said sulfuric acid with said solvent is conducted at a temperature of about 230–280° F.

References Cited
UNITED STATES PATENTS
3,462,512  8/1969  Goldsby _____ 260—683.62

DELBERT E. GANTZ, Primary Examiner
G. J. CRASANAKIS, Assistant Examiner

U.S. Cl. X.R.
23—172